Oct. 21, 1969   J. N. JENSEN ET AL   3,473,517
DRINKING DEVICE FOR DOMESTIC ANIMALS
Filed Aug. 8, 1967
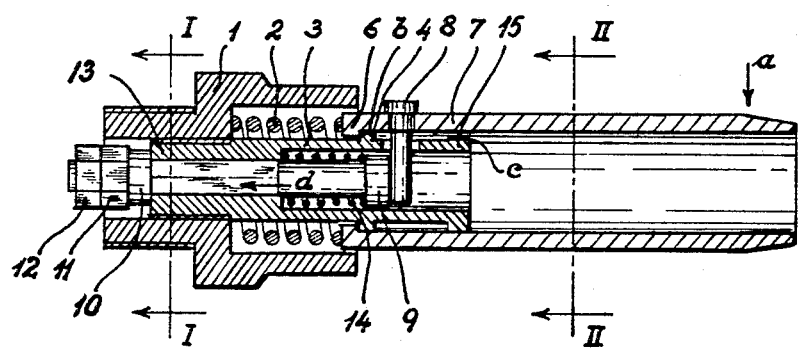
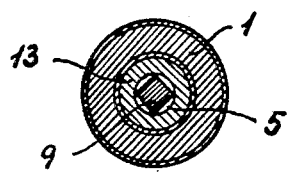
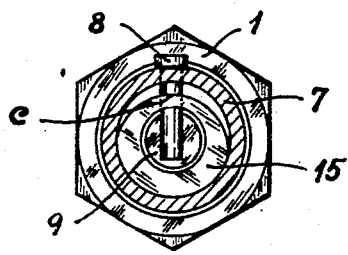
JENS NIELSEN JENSEN
and BORGE JENSEN INVENTORS.
BY *Albert M. Parker*
ATTORNEY.

3,473,517
DRINKING DEVICE FOR DOMESTIC ANIMALS
Jens N. Jensen, 8 Sondergade, Agerskov, Denmark,
and Borge Jensen, 31 Himmerlandsvej, Copenhagen,
Denmark
Filed Aug. 8, 1967, Ser. No. 659,198
Claims priority, application Denmark, Aug. 9, 1966,
4,091/66
Int. Cl. A01k 7/02; F16k 21/00
U.S. Cl. 119—72.5　　　　　　　　　　　　　4 Claims

ABSTRACT OF THE DISCLOSURE

A drinking device for connection to a pressure water pipe and having a drinking tap to be actuated by the mouth of the animal. Deflecting movement of the drinking tap results in axial movement of a valve spindle, whereby the valve is opened and water is delivered through the drinking tap.

---

The invention relates to a drinking device for domestic animals and of the type which is connected to a pressure water pipe and is provided with a drinking tap which the animal can move with its mouth, whereby a valve is actuated so as to allow water to flow directly into the mouth of the animal.

Drinking valves of the type mentioned have been suggested for delivering water to domestic house animals, such as dogs and cats, and poultry. In these drinking valves of the prior art the valve spindle is provided at the end opposite the valve seat with a member to be actuated by the animal with the result that the spindle is tilted and the valve is partly opened.

The amount of water delivered thereby is rather small, and the valves are not fit for use by larger animals, such as pigs.

The object of the invention is to provide a drinking valve for domestic animals, particularly pigs, which is capable of delivering sufficient water and is reliable in use.

A further object is to provide a drinking valve of the type mentioned, in which the water delivered by the valve is approximately proportional to the deflecting movement of the drinking tap.

Still a further object is to provide a drinking valve of the type described in which the maximum amount of water delivered is limited by a stop for limiting the deflecting movement of the drinking tap.

These, and other objects and advantages of the invention will be apparent from the following description and the accompanying drawing, wherein FIG. 1 is a longitudinal section of a drinking valve embodying the invention, FIG. 2 is a section on line I—I of FIG. 1, and FIG. 3 is a section on line II—II of FIG. 1.

Referring to FIG. 1 of the drawing, 1 designates a preferably cylindrical valve housing externally formed with a hexagonal nut portion as shown in FIG. 3 and a threaded portion to be screwed into an internally threaded socket of a pipe having water under substantial pressure. Internally, one-half of the valve housing 1 forms a casing for a compression spring 2. The other half of the valve housing 1 is internally threaded for receiving a central tube 3 having an annular collar 4 for engaging an annular inwardly extending collar 6 at one end of a drinking tap 7. Adjacent to the same end the drinking tap 7 is provided with a radial threaded bore for receiving an externally threaded pin 8 extending through a hole in the central tube 3 for engaging one end of a valve spindle 9 extending through the axially movable within the central tube. At the other end the valve spindle carries a valve disc retained by a nut 11 and a counter nut 12. The valve spindle 9 is guided by a portion 13, with reduced diameter, of the central tube 3, one end of the portion 13 forming a seat for the valve disc 10, the other end forming a seat for a compression spring 14. The valve spindle 9 is cylindrical in section on the portion surrounded by the compression spring 14, and as shown in FIG. 2 it is square in section on the portion thereof guided by the central tube 3. The central tube extends a distance into the drinking valve, where it is provided with an annular collar 15 serving as a stop for deflecting movement of the drinking tap 7. The collar 15 may be cylindrical for allowing equal deflecting travel of the drinking tap in all directions, or it may deviate from the cylindrical form as shown in FIG. 3 for allowing different deflecting travel of the drinking tap 7 in the various directions and thus different amounts of water delivered.

The drinking tap 7 is kept in undeflected position by the compression spring 2. If a downwardly directed force is exerted at the free end of the drinking tap 7 as indicated by an arrow *a*, for instance by the tap 7 being grasped by the mouth of a pig and urged downwards, the drinking tap 7 will be deflected turning about point *b* until it engages the collar 15 at *c*. This deflecting movement causes the pin 8 to move the valve spindle in a direction indicated by an arrow *d*, whereby the valve is opened, so that water will flow out through the segmental openings 5 shown in FIG. 2. When the force exerted on the drinking tap is relieved, compression springs 14 and 2 will urge the valve spindle and the drinking tap, respectively, back to the position of rest shown in FIG. 1.

We claim:

1. A drinking device for domestic animals including a housing, comprising means for connecting one end of the housing to a pipe having water under substantial pressure therein, a valve comprising a spindle axially movable against the action of a spring within a central tube from a position in which the valve is closed to a position in which the valve is open to allow water to flow through the central tube, a drinking tap the inner end of which is engaging the end portion of the central tube remote from the valve so as to allow deflecting of the projecting end portion of the drinking tap against spring action, and means on the drinking tap for axially moving the valve spindle for opening the valve when the drinking tap is deflected.

2. A drinking valve according to claim 1 wherein the central tube at the end projecting into the drinking tap is provided with means acting as a stop for limiting the deflecting movement of the drinking tap.

3. A drinking valve according to claim 2 wherein the means acting as a stop comprise an annular collar allowing only substantially vertical deflection of the drinking tap.

4. A drinking valve according to claim 1 wherein the drinking tap is provided with an inwardly extending annular collar engaging an outwardly extending annular collar on the central tube.

(References on following page)

References Cited

UNITED STATES PATENTS

| | | | |
|---|---|---|---|
| 1,454,284 | 5/1923 | Holmes | 222—445 |
| 2,510,252 | 6/1950 | Pine | 119—72.5 |
| 2,678,630 | 5/1954 | Frederiksen | 119—72.5 X |
| 2,904,222 | 9/1959 | Philippe | 222—320 X |
| 3,032,272 | 5/1962 | Nesky | 251—351 X |
| 3,095,127 | 6/1963 | Green | 251—353 X |

FOREIGN PATENTS

| | | |
|---|---|---|
| 1,050,131 | 8/1953 | France. |
| 641,507 | 8/1950 | Great Britain. |

ALDRICH F. MEDBERY, Primary Examiner

U.S. Cl. X.R.

119—71, 75; 222—320; 251—353